United States Patent [19]

Chalvignac et al.

[11] Patent Number: 6,164,141
[45] Date of Patent: Dec. 26, 2000

[54] GAS DELIVERY SENSOR AND RESPIRATORY AID APPLIANCE COMPRISING SUCH A SENSOR

[75] Inventors: Philippe Chalvignac, Acheres-la-Foret; Jean-Philippe Mercier, Brie-Comet-Robert, both of France

[73] Assignee: Societe d'Applications Industrielles Medicales et Electroniques, Savigny le Temple, France

[21] Appl. No.: 09/120,001

[22] Filed: Jul. 21, 1998

[30] Foreign Application Priority Data

Jul. 23, 1997 [FR] France .................................. 9709380

[51] Int. Cl.[7] ................................ G01F 1/37; F15D 55/00
[52] U.S. Cl. ................................ 73/861.52; 73/861.54; 138/42
[58] Field of Search ........................... 73/861.54, 861.52, 73/202; 138/42, 39

[56] References Cited

U.S. PATENT DOCUMENTS

| 4,418,723 | 12/1983 | Koni et al. | 73/861.52 |
| 4,800,754 | 1/1989 | Korpi | 73/202 |
| 5,044,199 | 9/1991 | Drexel et al. | 73/202 |
| 5,445,035 | 8/1995 | Delajoud | 73/851.52 |
| 5,804,717 | 9/1998 | Lucas | 73/202 |

*Primary Examiner*—Hashad Patel
*Attorney, Agent, or Firm*—Arthur L. Plevy; Buchanan Ingersoll PC.

[57] ABSTRACT

A gas delivery sensor, of the type in which two upstream and downstream pressure pick-up conduits, which are each connected to a pressure sensor, open into a gas flow duct, in which a permeable element extends axially at least between opening ends of the two pressure pick-up conduits characterized in that the permeable element is produced in the form of a body which has, in cross-section, a shape complementary to that of the duct and which includes slots extending radially about its axis, so as to open radially onto an outer lateral surface of the body, and in that the slots extend axially over the entire length of the permeable body.

17 Claims, 4 Drawing Sheets

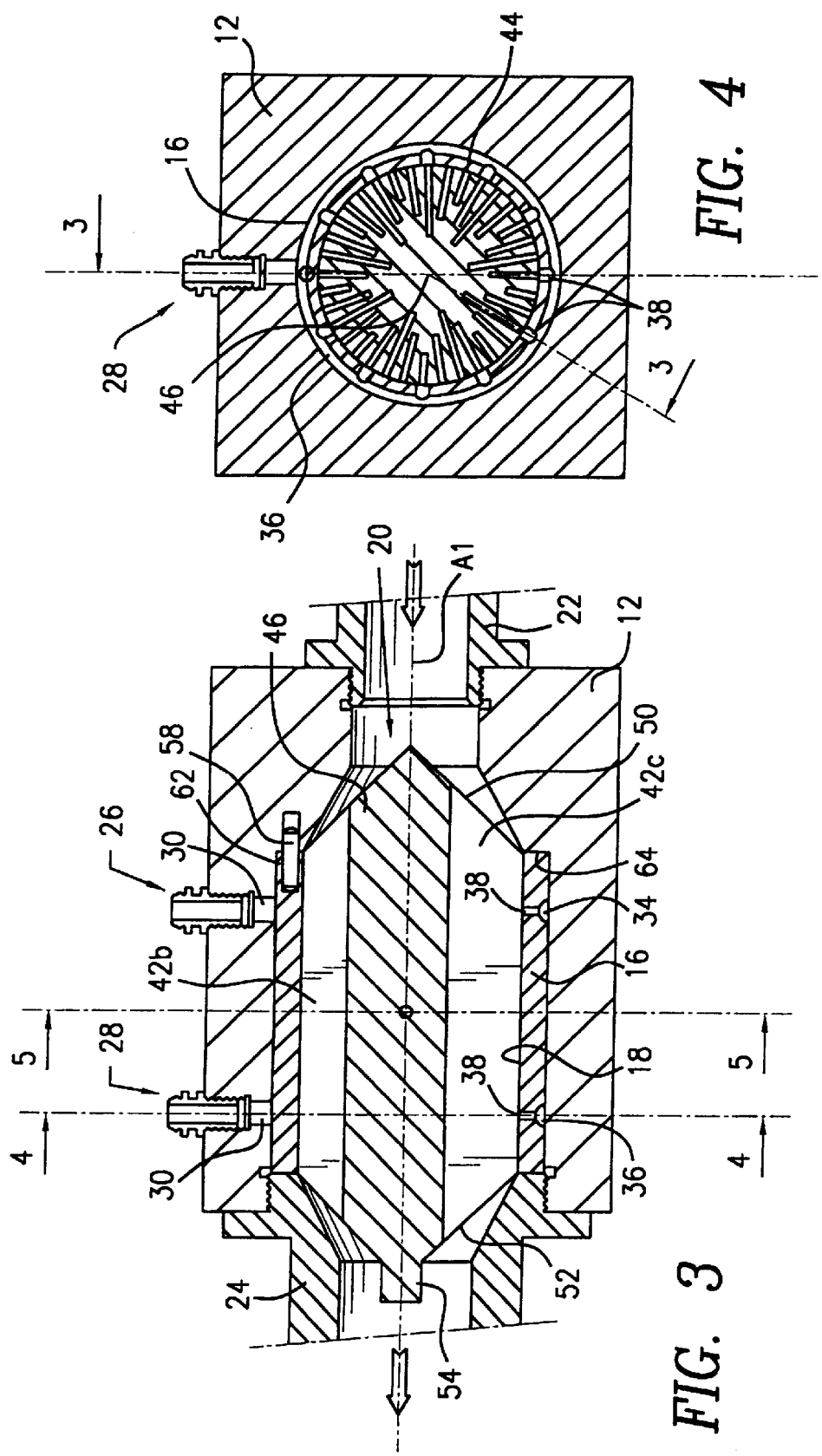

GAS DELIVERY SENSOR AND RESPIRATORY AID APPLIANCE COMPRISING SUCH A SENSOR

The invention relates to a gas delivery sensor.

The invention relates, more particularly, to a gas delivery sensor, of the type in which two upstream and downstream pressure pick-up conduits, which are each connected to a pressure sensor, open into a gas flow duct, in which a permeable element extends axially at least between the opening ends of the two pressure pick-up conduits.

Such sensors measure the pressure difference upstream and downstream of the permeable element, in order to deduce the gas delivery from this, the permeable element causing a pressure drop in the flow.

Such sensors are used, in particular, in respiratory aid appliances, in order to ascertain the value of the delivery breathed in or breathed out by a patient.

In such a use, the measurement of the delivery must be particularly accurate, in order to allow the respiratory aid appliance to function as efficiently as possible, especially so as to ensure a satisfactory degree of comfort for the patient who is using it.

Such gas delivery sensors are known, in which the permeable element consists of a winding of a stack of two metal sheets, one of which is corrugated, the said winding being about the axis of the gas flow duct.

Thus, in the winding, the corrugated sheet is retained between two portions of the flat sheet, in such a way that axial passages for the flow of the gas are delimited between these two portions.

However, such an embodiment of the permeable element of the delivery sensor proves particularly complicated and difficult to implement. Moreover, in such a design of the delivery sensor, the opening ends of the pressure conduits must necessarily be offset axially in the upstream and downstream directions in relation to the permeable element. In fact, the winding of the two sheets of the permeable element comes to bear, in its last turn, against the inner cylindrical surface of the flow duct, into which the ends of the pressure pick-up conduits open. If these ends were to open axially opposite the permeable element, therefore, they would be, as it were, blocked by the sheets of the winding of the permeable element.

By arranging the opening ends of the pressure pick-up conduits upstream and downstream of the permeable element, then, these ends are placed in portions of the gas flow duct in which the gas stream may be particularly turbulent, this being detrimental to the high quality of the pressure measurements and, consequently, to the high quality of the delivery measurement.

The object of the invention is, therefore, to provide a new design of a gas delivery sensor, in particular a new design of the permeable element producing a pressure drop, making it possible to ensure that the pressure measurements carried out are highly accurate and highly representative, whilst at the same time reducing the production cost.

For this purpose, the invention provides a gas delivery sensor of the type described above, characterized in that the permeable element is produced in the form of a body which has, in cross-section, a shape complementary to that of the duct and which comprises slots extending radially about its axis, so as to open radially onto an outer lateral surface of the body, and in that the slots extend axially over the entire length of the permeable body.

According to other characteristics of the invention:

- the permeable body comprises slots having different depths;
- the depths of the slots is always smaller than the radius of the permeable body, so that the latter comprises a central core;
- the central core comprises at least one axial bore which passes right through it;
- the permeable body comprises at least one rotationally cylindrical section;
- the slots are delimited angularly, about the axis of the permeable body, by mutually opposite parallel faces;
- the slots are delimited angularly, about the axis of the permeable body, by radially oriented faces, in such a way that the slots are V-shaped in cross-section;
- the permeable body comprises a conical upstream axial end pointed in the upstream direction;
- at least one of the axial ends of the permeable body is arranged outside the axial interval which separates the opening ends of the two conduits, and means are provided for indexing the permeable body angularly about its axis, in such a way that the opening end of the conduit corresponding to the said end of the permeable body is arranged radially opposite a slot of the permeable body;
- the opening end of at least one of the conduits is branched in such a way that branches open out radially opposite slots having different depths;
- the sensor comprises an outer body, in which is engaged a tubular bush which delimits the gas flow duct, the bush comprises two series of radial bores which, on the one hand, open inwards opposite the slots and, on the other hand, open outwards respectively into two annular grooves made in an outer cylindrical surface of the bush, and the outer body comprises two channels which each open out opposite one of the grooves and which are connected to pressure sensors;
- the sensor comprises means for orienting the bush angularly relative to the outer body, in such a way that the channels of the outer body do not open out opposite a radial bore of the bush;
- the sensor comprises means for heating the permeable body;
- the sensor is intended for measuring a gas delivery breathed in or breathed out by a patient;
- the sensor is inserted into a breathing-in or breathing-out circuit of a respiratory aid appliance.

The invention also relates to a respiratory aid appliance, characterized in that it comprises a gas delivery sensor having any one of the preceding characteristics.

Other characteristics and advantages of the invention will emerge from a reading of the following detailed description, to understand which reference will be made to the accompanying drawings in which:

FIG. 3 is a view of the sensor in axial section along the line 3—3 of FIG. 4;

Figure 5:
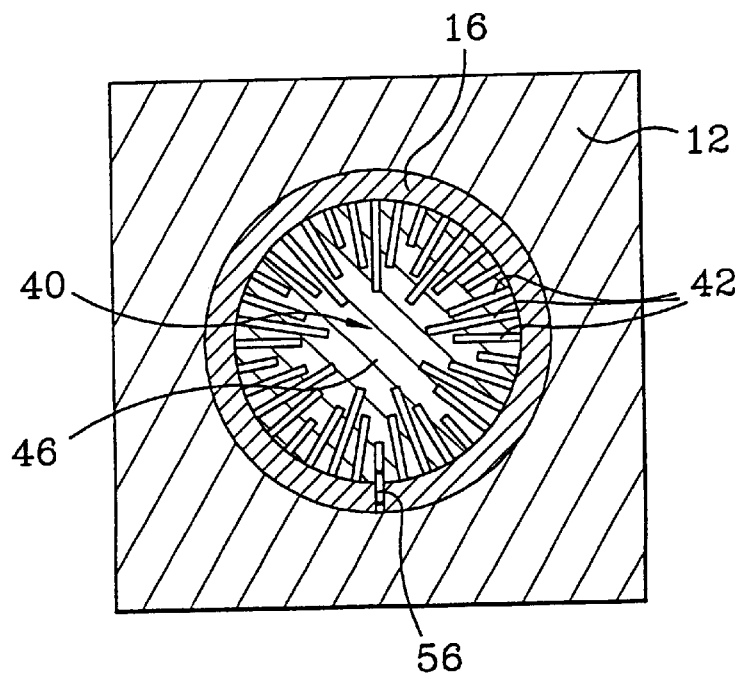
Figure 6:
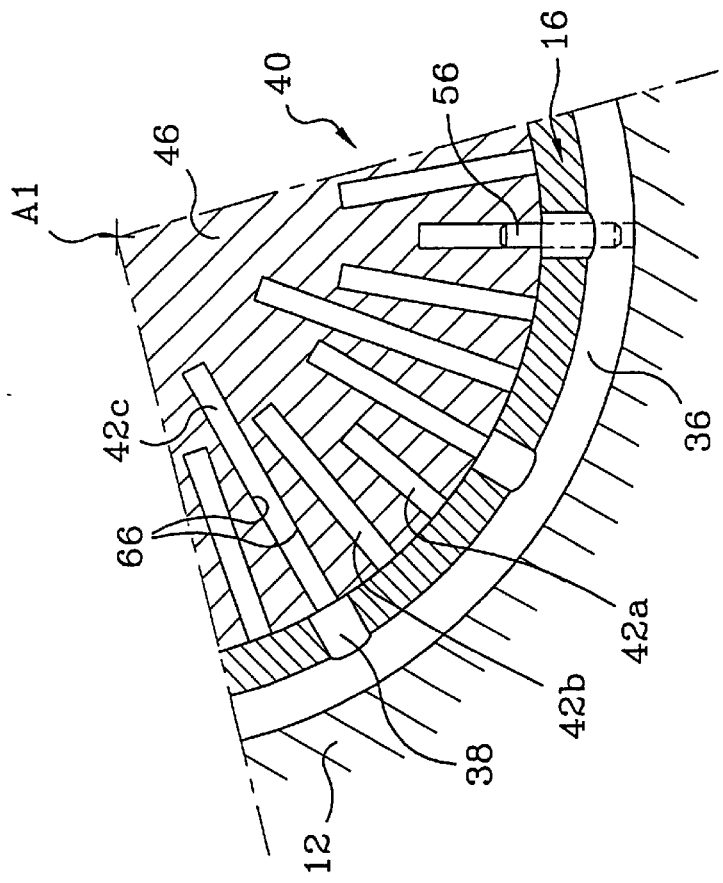
Figure 7:
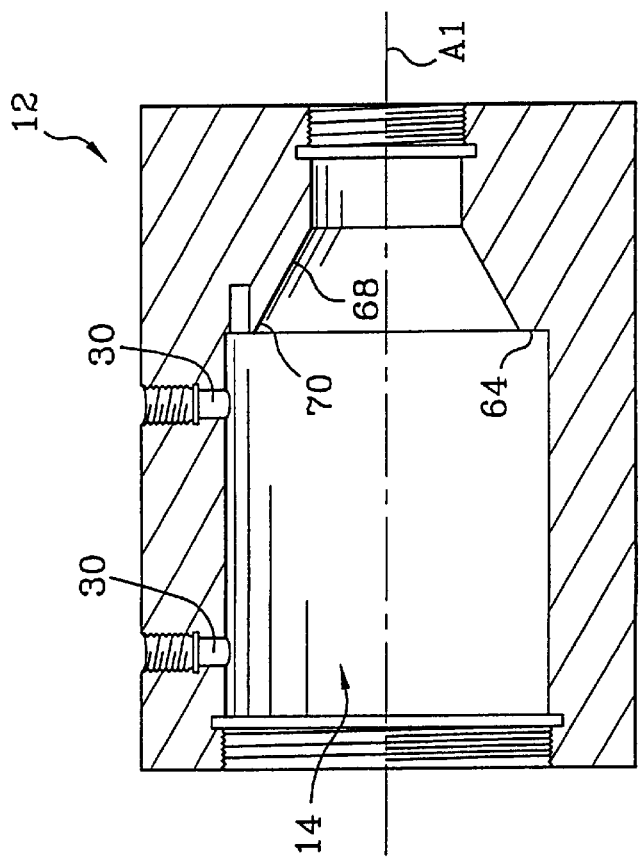

FIGS. 4 and 5 are cross-sectional views along the lines 4—4 and 5—5 of FIG. 3 respectively;

FIG. 6 is an enlarged view of a detail of FIG. 4;

FIG. 7 is a view in axial section of the outer body of the sensor according to the invention.

The Figures show a sensor 10 which is intended for measuring a gas delivery.

The sensor 10 thus comprises an outer body 12 which has an open-ended central drillhole 14 of axis A1, into which a tubular bush 16 is to be introduced. An inner cylindrical surface 18 of the bush 16 delimits a duct 20, in which the gas flows, the said gas entering the sensor 10 by way of an inlet port 22 and emerging from it by way of an outlet port 24.

The delivery sensor 10 which is shown here takes the form of an independent and separate block contained entirely within the outer body 12.

However, such a sensor 10 may advantageously be integrated into a complex pneumatic assembly, such as the valve block of a respiratory aid appliance, the valve block then forming the outer body. The sensor is then inserted into a breathing-in or breathing-out circuit of the appliance, in order to ascertain with high accuracy the gas volumes breathed in or breathed out by the patient.

Figure 1:
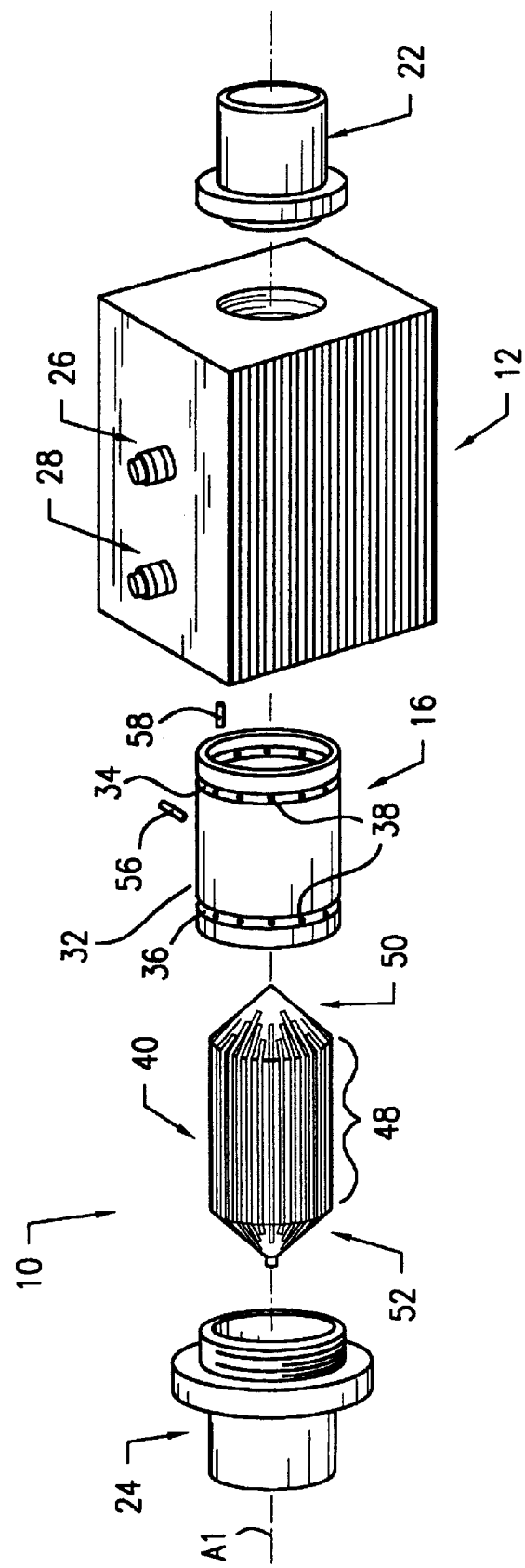
FIG. 1 is an exploded perspective view illustrating a gas delivery sensor according to the teachings of the invention.
Figure 2:
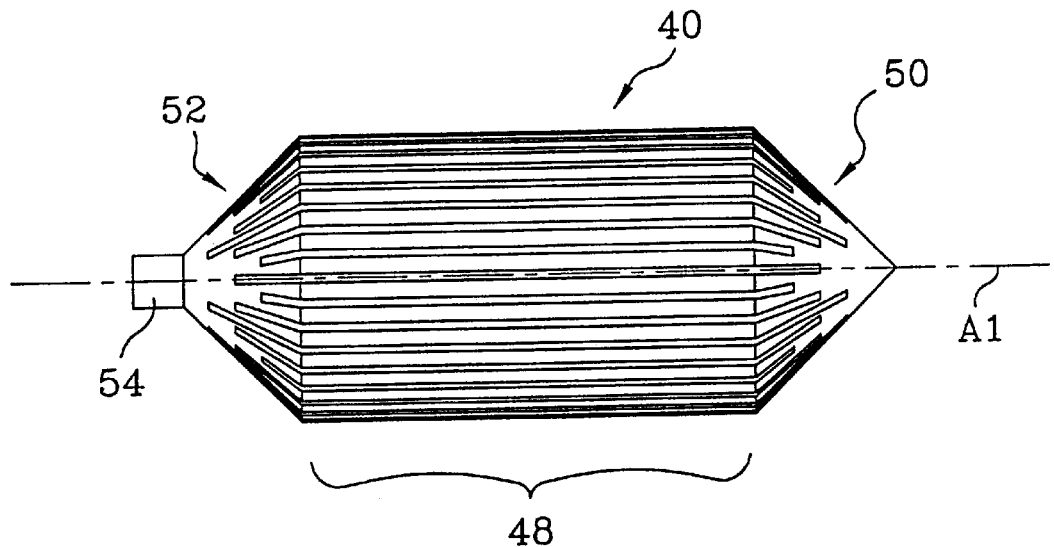
FIG. 2 is a side view illustrating the permeable body of the sensor of FIG. 1 on a larger scale.

As may be seen in FIGS. 1, 3 and 4, the sensor 10 comprises two pressure pick-up conduits 26, 28 which open into the gas flow duct 20 and which are each intended to be connected to a pressure sensor (not shown).

More specifically, each conduit 26, 28 comprises a channel 30, cut in the main body 12 of the sensor 10, and an opening end made in the tubular bush 16.

In fact, the bush 16 comprises, in its outer cylindrical lateral surface 32, two annular grooves, respectively upstream 34 and downstream 36, and, at the bottom of each of these grooves 34, 36, there is a series of radial bores 38 which open radially outwards into one of the grooves 34, 36 and radially inwards onto the inner cylindrical surface 18 of the bush 16.

As may be seen in FIG. 3, when the bush 16 is in place inside the outer body 12, the channels 30 of each of the pressure pick-up conduits 26, 28 open out axially opposite the annular grooves 34, 36. Thus, each of the grooves 34, 36 forms, with the corresponding radia bones 38, a branched opening end for each of the conduits 26, 28.

There is provision, in a known way, for engaging a permeable body into the flow duct 20 axially between the opening ends of each of the two pressure pick-up conduits 26, 28.

According to the invention, the permeable body 40 of the sensor 10 is produced in the form of a body which has a cylindrical central section 48 and two conical end sections, respectively upstream 50 and downstream 52, which each point respectively in the upstream and downstream direction.

The half angles at the vertex of the conical sections 50, 52 are, for example, 45°. Moreover, the downstream conical section 52 is provided with a cylindrical stub 54 which extends it axially downstream.

The central section 48 thus has, in cross-section, a shape complementary to that of the flow duct 20, that is to say, in this particular case, a circular cross-section of the same diameter as the duct 20.

Moreover, the permeable body 40 comprises a series of radially oriented slots 42 which are distributed uniformly about the axis A1 and which extend axially over the entire length of the permeable body 40, for the purpose of providing a passage for the gas which flows through the sensor 10.

As may be seen more particularly in FIGS. 4, 5 and 6, the slots 42 all open radially outwards onto an outer cylindrical surface 44 of the permeable body 40, but it can be seen that they have different radial depths.

Thus, in the exemplary embodiment shown in the Figures, three series of slots 42a, 42b, 42c corresponding to three different radial depths may be distinguished.

However, the depth of the slots 42 never exceeds the radius of the permeable body 40, and this depth is even smaller than this radius, in order, at the centre of the permeable body 40, to provide a solid axial core 46 which preserves the rigidity of the latter.

In order to reduce the pressure drop caused by the permeable body 40, this pressure drop nevertheless being necessary for the very operating principle of a sensor of this type, there may be provision for cutting in the central core 46 one or more axial bores which pass right through it.

The three series of slots 42a, 42b, 42c are arranged in such a way that a slot of large depth 42c is framed by two slots 42b of medium depth. Likewise, a slot of small depth 42a, too, is framed by two slots of medium depth 42b.

As may be seen in FIG. 6, the slots 42 are slots having parallel flanks 66. However, there may be provision for the flanks 66 laterally delimiting them to be slightly inclined relative to one another, in order to make the slot 42 V-shaped in cross-section.

As may be seen in FIG. 3, when the permeable body 40 is engaged axially into the bush 16, itself engaged into the outer body 12, the bores 38, which form the branched opening ends of the pressure pick-up conduits 26, 28, open out radially opposite the slots 42a, 42b, 42c.

For this purpose, means for indexing the permeable body 40 angularly relative to the bush 16 are provided. As an example, these means of angular indexation may be produced with the aid of a pin 56 which is integral with the bush 16 and which extends radially inwards, so as to be engaged in one of the slots 42 of the permeable body 40.

Moreover, the bores 38 of the bush 16 are distributed angularly, in such a way that, for each of the two conduits 26, 28, there is at least one bore 38 which opens out opposite a slot of each of the three series of slots 42a, 42b, 42c having different depths.

As may be seen more particularly in FIG. 4, there is provision for the bush 16 not to comprise a bore 38 which opens out opposite the corresponding channel 30 of the outer body 12. For this purpose, an axially oriented orientation stud 58, which, for example, is integral with the outer body 12, is intended to be engaged in a corresponding indexing hole, itself also axially oriented, which is formed in an upstream transverse annular end face 62 of the bush 16.

As may be seen in FIG. 3, the bush 16 is intended to come to bear axially, in the upstream direction, against a transverse annular shoulder face 64 of the drillhole 14 of the outer body 12.

This transverse annular shoulder face 64 is extended upstream by a frustoconical surface 68 pointed in the upstream direction and having a half angle at the vertex of about 30°.

Thus, when the permeable body 40 is engaged axially into the bush 16 and the outer body 12, it is capable of coming to bear axially, in the upstream direction, with a peripheral portion of its upstream conical section 50, against the downstream edge of large diameter 70 of the frustoconical surface 68. The difference in conicity between the upstream conical section 50 and the frustoconical surface 68, together with the fact that the slots 42 open axially into the conical sections 50, 52, makes it possible to leave a sufficient passage for the gas which flows through the sensor 10.

As may be seen in FIG. 3, the axial length of the central section 48 of the permeable body 40 is such that the said central section extends axially upstream of the radial bores 38 of the upstream pressure pick-up conduit 26 and downstream of the radial bores 38 of the downstream pressure pick-up conduit 28.

Thus, the upstream and downstream pressure pick-ups are carried out in a zone of the sensor 10 in which the gas flows within the slots 42.

By virtue of the design of the permeable body 40 according to the invention, then, the flow of gases in the slots 42 is laminar or quasi-laminar, this being conducive to high accuracy in the upstream and downstream pressure measurements and, consequently, in the delivery measurement capable of being carried out by means of the sensor 10.

The permeable body 40 may be produced equally from plastic, such as "delrin" or from a metallic material, for example aluminium.

When the delivery sensor 10 is used for measuring the volume of air breathed in or breathed out by a patient, it may be expedient to provide means for heating the permeable body 40, in order to avoid any risk of air condensing on the latter.

This heating may be carried out in various ways. According to choice, heating may take place from outside, that is to say by way of the outer body 12, or it may take place from inside, for example by arranging a heating resistor in the central core 46 of the permeable body 40.

If the permeable body 40 is produced from a metallic material having suitable magnetic properties, this heating may also take place by induction.

The permeable body 40 may be produced from a solid initial block, in which the slots 42 are cut with the aid of a side-and-face milling cutter. However, there may also be provision for producing the permeable body 40 by moulding, the slots 42 then being directly produced integrally.

Of course, the number of slots 42 and their respective widths may vary according to the gas delivery flowing through the sensor 10 and according to the pressure drop which is to be brought about with the aid of the permeable body 40.

What is claimed is:

1. A gas delivery sensor, having an upstream and a downstream pressure pick-up conduit, each conduit including an open end, each of said conduits being connected to a pressure sensor and said open ends of each conduit opening into a gas flow duct, comprising:
    a permeable body, which has, in cross-section, a shape complementary to that of the duct, said permeable body extending in an upstream and downstream direction between said open ends of said upstream and said downstream pick-up conduits along an axis of said permeable body; and
    a plurality of slots having different depths extending radially about the axis of said permeable body and opening radially onto an outer lateral surface of said permeable body, said slots extending axially along said axis of said permeable body.

2. A gas delivery sensor according to claim 1, wherein the depth of said slots is always smaller than the radius of said permeable body, and wherein said permeable body comprises a central core.

3. A gas delivery sensor according to claim 2, wherein said permeable body comprises at least one rotationally cylindrical section.

4. A gas delivery sensor according to claim 3, wherein said slots are delimited angularly about the axis of said permeable body by radially oriented faces, in such a way that the slots are V-shaped in cross-section.

5. A gas delivery sensor according to claim 1, wherein said permeable body comprises at least one rotationally cylindrical section.

6. A gas delivery sensor according to claim 5, wherein said slots are delimited angularly about the axis of said permeable body by mutually opposite parallel faces.

7. A gas delivery sensor according to claim 1, wherein said slots are delimited angularly about the axis of said permeable body by mutually opposite parallel faces.

8. A gas delivery sensor according to claim 1, wherein said slots are delimited angularly about the axis of said permeable body by radially oriented faces, in such a way that the slots are V-shaped in cross-section.

9. A gas delivery sensor according to claim 8, wherein said permeable body comprises at least one conical end pointed in said upstream direction.

10. A gas delivery sensor according to claim 9, wherein means are provided for indexing said permeable body angularly about said axis of said permeable member, wherein said open end of the conduit corresponding to said at least one conical end of said permeable body is arranged radially opposite one of said slots of said permeable body.

11. A gas delivery sensor according to claim 10, wherein the opening end of at least one of the conduits is branched, in such a way that branches open out radially opposite said slots having different depths.

12. A gas delivery sensor according to claim 11, wherein said sensor comprises an outer body, in which is engaged a tubular bush which delimits the gas flow duct, said bush comprising two series of radial bores which open inwardly opposite said slots and open outwardly into two annular grooves made in an outer cylindrical surface of said bush, and said outer body comprises two channels which each open out opposite one of the grooves and which are connected to pressure sensors.

13. A gas delivery sensor according to claim 12, wherein said sensor comprises means for orienting the bush angularly relative to the outer body, in such a way that the channels of the outer body do not open out opposite a radial bore of the bush.

14. A gas delivery sensor according to claim 13, wherein said sensor is intended for measuring a gas delivery breathed in or breathed out of a patient.

15. A gas delivery sensor according to claim 14, wherein said sensor is inserted into a breathing-in or breathing-out circuit of a respiratory aid appliance.

16. A gas delivery sensor according to claim 10, wherein said sensor comprises an outer body, in which is engaged a tubular bush which delimits the gas flow duct, said bush comprising two series of radial bores which open inwardly opposite said slots and open outwardly into two annular grooves made in an outer cylindrical surface of said bush, and said outer body comprises two channels which each open out opposite one of the grooves and which are connected to pressure sensors.

17. A respiratory aid appliance, wherein said appliance comprises a gas delivery sensor, said gas delivery sensor having an upstream and a downstream pressure pick-up conduit, each conduit including an open end, each of said conduits being connected to a pressure sensor and said open ends of each conduit opening into a gas flow duct, comprising:
    a permeable body, which has, in cross-section, a shape complementary to that of the duct, said permeable body extending in an upstream and downstream direction between said open ends of said upstream and said downstream pick-up conduits along an axis of said permeable body; and
    a plurality of slots having different depths extending radially about the axis of said permeable body and opening radially onto an outer lateral surface of said permeable body, said slots extending axially along said axis of said permeable body.

* * * * *